(No Model.)
J. H. BASSLER.
APPARATUS FOR CONDENSING LIQUIDS.
No. 394,434. Patented Dec. 11, 1888.
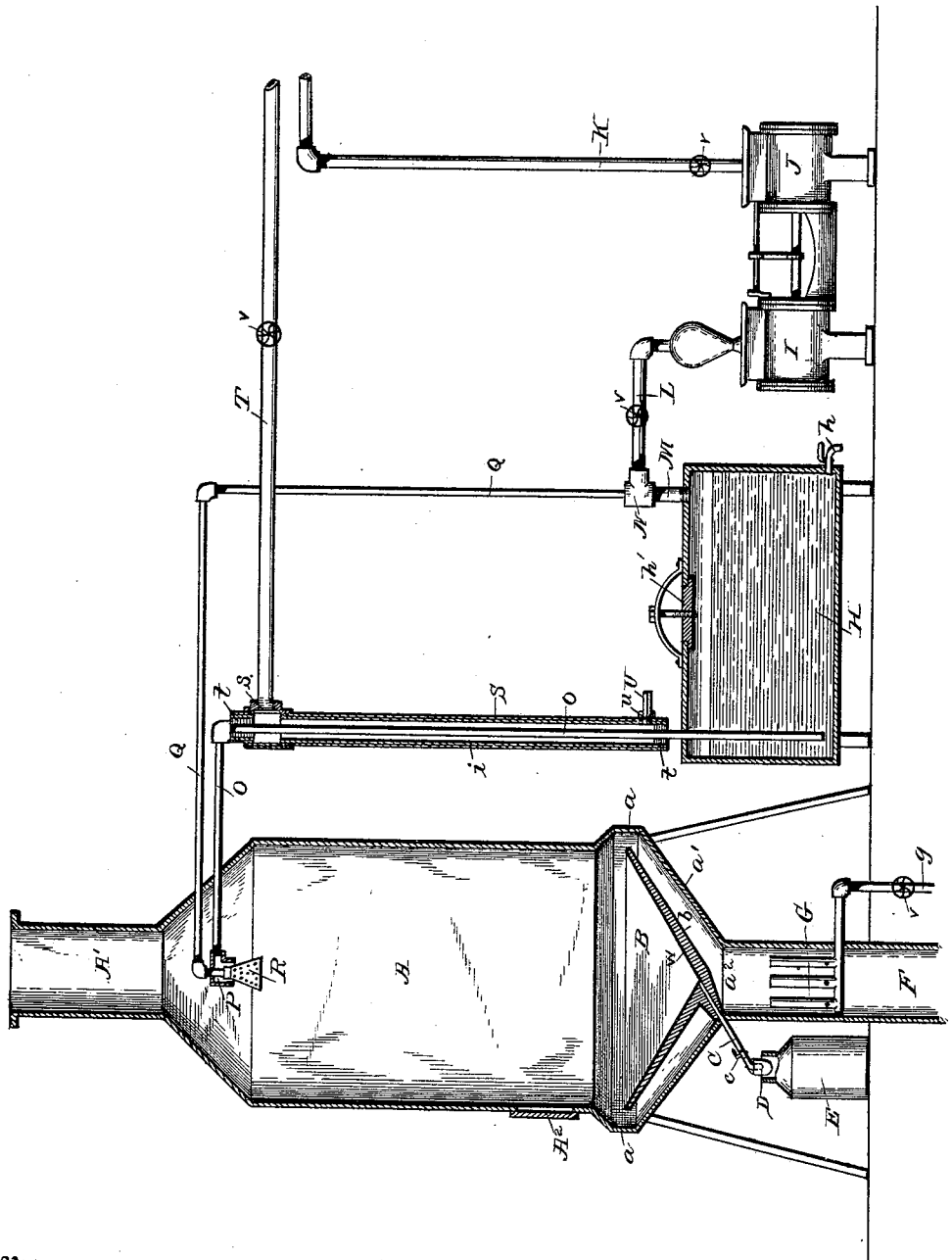
Witnesses.
Albert Speiden.
W. Henry Walker.
Inventor.
John H. Bassler.
By his Attorneys
Anderson & Myers.
N. PETERS, Photo-Lithographer, Washington, D. C.

UNITED STATES PATENT OFFICE.

JOHN H. BASSLER, OF MYERSTOWN, PENNSYLVANIA.

APPARATUS FOR CONDENSING LIQUIDS.

SPECIFICATION forming part of Letters Patent No. 394,434, dated December 11, 1888.

Application filed June 16, 1888. Serial No. 277,317. (No model.)

*To all whom it may concern:*

Be it known that I, JOHN H. BASSLER, a citizen of the United States of America, residing at Myerstown, in the county of Lebanon and State of Pennsylvania, have invented certain new and useful Improvements in Apparatus for Condensing Liquids, of which the following is a specification, reference being had therein to the accompanying drawing.

My invention relates to an apparatus for condensing liquids—such as milk, cane-juice, glucose, solutions of tannin, &c.—and it consists in certain details of construction and combinations of parts, which will first be described in connection with the accompanying drawing, and then pointed out in the claims.

In an application for Letters Patent of the United States for improvements in apparatuses for condensing liquids, filed by me on the 24th day of February, 1888, Serial No. 265,119, I have illustrated and described certain portions of the apparatus embraced in the present application, none of which portions, however, are herein specifically claimed. In the apparatus alluded to the liquid is forced under steam-pressure and mixed with steam into the vaporizing-vessel, whereas in the apparatus now to be described the liquid is forced to the vaporizing-vessel by means of air-pressure, and is sprayed by means of an air-blast, the heating of the liquid to counteract the chilling effect of the freed compressed air at the sprayer, and, when the liquid is milk, to kill the germs, being effected without bringing steam into contact with the liquid, thus avoiding the presence in the latter of water of condensation.

In the accompanying drawing, which is mainly a sectional view of my apparatus, A represents a vertical vaporizing-vessel, preferably cylindrical in form, enlarged in diameter at its lower end, as at $a$, and having an outlet-flue, A', at its top. It is also provided with a door, A², in its side to afford access to its interior for cleaning it. The bottom $a'$ of the vessel slopes downward and inward, and is open, as at $a^2$, so as to afford open communication with the air-flue. The vessel is supported by legs $l$.

The vessel A is provided a short distance above its bottom with a non-heat-conducting hopper, B, constructed, preferably, of a sheet-metal casing, $b$, filled with mineral wool $w$. The diameter of the hopper is somewhat less than that of the enlarged portion $a$ of vessel A, by reason of which an annular space is left between the hopper and the walls of the vessel.

One end of a drain-pipe, C, enters the hopper and the other end enters a seal-cup, D, placed in the mouth of a receiving-can, E, the drain-pipe being provided with a stop-cock, $c$.

F represents an air-flue, whose upper end is in open communication with the interior bottom portion of vessel A, and for the purpose of heating the air to be delivered to the vaporizing-vessel I place any suitable number of Bunsen burners, G, in this flue a short distance below the bottom of the vessel, these burners being connected to a gas-pipe, $g$, leading from any suitable source of gas-supply; but I do not confine myself to the use of gas-burners for heating the air in the vaporizing-vessel, as it is evident that any of the well-known means for heating air may be employed without in the least departing from my invention.

H represents a steel pressure-cylinder provided at one end with a draw-off cock, $h$. There is also a man-hole in its top, through which the liquid may be put into the cylinder and access had to its interior for cleaning it, the man-hole being covered by a lid, $h'$.

I represents an ordinary air-pump, operated, preferably, by a steam-engine, J, deriving steam through a pipe, K, from any suitable source, not necessary to illustrate or describe.

The air-pump is connected with the pressure-cylinder by means of a pipe, L, one end of which is connected to the pump, a short pipe, M, screwed into the cylinder, and a T-connection, N, uniting pipes L and M.

O represents the fluid-pipe, one end of which enters the cylinder, extending to near the bottom, and its other end enters the vaporizing-vessel near its top and screws into an elbow, P, the interior diameter of the downwardly-extending portion of which is considerably greater than that of the part into which pipe O is screwed.

Q represents a small air-tube, which extends from the T N, into which it is screwed, up ward and forward, and passes into vessel A a short distance above pipe O. Its inner end is turned downward, passed through a hole in the top of elbow P, and is screwed a short distance into a cone-shaped spraying device, R, perforated circumferentially, but having a close bottom, the apex of cone R extending a short distance inside the elbow P.

For the purpose of heating the liquid, the greater portion of the fluid-pipe O is inclosed in another pipe, S, of such size as to leave a space all around the fluid-pipe. Another pipe, T, leading from the steam-boiler, is connected with the pipe S, as at $s$, and an exhaust-pipe, U, is also connected with it, as at $u$. A suitable steam-packing, $t$, is placed around pipe O in the upper and lower ends of pipe S, in order to prevent the escape of steam at that point, and the pipe S is covered with any non-heat-conducting material, $i$, as asbestus.

The various pipes are provided with the necessary globe-valves $v$.

The operation of my apparatus is quite simple. The liquid to be treated is placed in the pressure-cylinder. The burners are then lighted to heat the vaporizing-vessel, and steam is turned into pipe S to heat pipe O and the liquid which is to pass through it. The air-pump is then put in motion, thus forcing air into the pressure-cylinder. When sufficient air-pressure is on the liquid, the latter will be forced up through the pipe O and into vessel A, where it will flow out of the elbow P and over the spraying device. At the same time that air is being forced into the cylinder a small current is also forced up through the air-tube Q and into the interior of the spraying device, by means of which the liquid is sprayed outward in all directions. Then while the liquid films are descending to the bottom of the vaporizing-vessel they pass through a continuously-ascending current of hot air from the gas-burners, and in this manner the aqueous element is eliminated and driven off, when the condensed liquid will flow from the hopper through the drain-pipe into the seal-cup, from which it will overflow into the can. As the seal-cup is never empty during the time the apparatus is in operation, the liquid therein will prevent the admission of cold air through the drain-pipe into the vaporizing-vessel.

Having thus described my invention, what I claim as new, and desire to secure by Letters Patent, is—

1. In an apparatus for condensing liquids, the combination, with a vaporizing-vessel, of a pressure-cylinder, an air-pump in communication with said cylinder, a fluid-pipe leading from the interior of the pressure-cylinder to the interior of the vaporizing-vessel, an air-tube in communication with the air-pump and leading into the vaporizing-vessel, and a spraying device secured to the air-tube inside said vessel, for the purposes set forth.

2. In an apparatus for condensing liquids, the combination, with a vaporizing-vessel, of a pressure-cylinder, an air-pump in communication with said cylinder, a fluid-pipe leading from the interior of the pressure-cylinder to the interior of the vaporizing-vessel, a device for heating said pipe, an air-tube in communication with the air-pump and leading into the vaporizing-vessel, and a spraying device secured to the air-tube inside said vessel, for the purposes set forth.

In testimony whereof I affix my signature in presence of two witnesses.

JOHN H. BASSLER.

Witnesses:
WM. H. MYERS,
ALBERT SPEIDEN.